United States Patent [19]

Fink

[11] 4,349,207
[45] Sep. 14, 1982

[54] FLUID ACTUATED CHUCK

[75] Inventor: Anton Fink, Searingtown, N.Y.

[73] Assignee: Metrology Systems Corp., Plainview, N.Y.

[21] Appl. No.: 207,013

[22] Filed: Nov. 14, 1980

[51] Int. Cl.³ .................... B23B 31/30; B23B 5/34
[52] U.S. Cl. ......................................... 279/4; 279/121
[58] Field of Search ................................... 279/4, 121

[56] References Cited

U.S. PATENT DOCUMENTS

| | | | |
|---|---|---|---|
| 2,768,830 | 10/1956 | Janson | 279/121 |
| 2,948,540 | 8/1960 | Garberding | 279/4 |
| 3,610,645 | 10/1971 | Roddy | 279/121 |
| 3,692,320 | 9/1972 | Lindelof | 279/4 |
| 3,771,803 | 11/1973 | Hiestland | 279/4 |
| 3,807,259 | 4/1974 | Buck | 279/4 |
| 3,892,165 | 7/1975 | Lioux | 279/4 |
| 3,926,446 | 12/1975 | Rohn | 279/121 |
| 3,954,275 | 5/1976 | Pickles | 279/4 |

*Primary Examiner*—William R. Briggs
*Assistant Examiner*—Paul M. Heyrana, Sr.
*Attorney, Agent, or Firm*—Hedman, Casella, Gibson & Costigan

[57] ABSTRACT

A fluid actuated chuck is disclosed wherein the piston-cylinder drive assembly is rotationally immobile relative to the chuck body. More particularly, a fluid actuated chuck is disclosed having a cylindrical body adapted to be rotated about its central axis and including radially movable master jaws. An actuator ring is provided which is operatively connected to the master jaws of the chuck body in a manner such that the axial movement of the actuator means effects the radial movement of the master jaws. A reciprocating piston-cylinder drive assembly is rotatably mounted about the chuck body and is capable of generating a force directed axially along the chuck body. A radial thrust bearing is interconnected between the piston-cylinder drive assembly and the actuator ring to transmit the axially directed forces generated by the drive assembly to the actuator ring. In operation, fluid pressure is used to actuate the piston-cylinder drive assembly. The axially directed force generated by the drive assembly is transmitted via the thrust bearing to the actuator ring thereby effecting the radial movement of the master jaws. Since the chuck body is rotated independently of the piston-cylinder drive assembly, rotating or running seals are eliminated.

2 Claims, 6 Drawing Figures

FLUID ACTUATED CHUCK

BACKGROUND OF THE INVENTION

The subject invention relates to a fluid actuated chuck wherein the piston-cylinder drive assembly is rotationally independent of the chuck body such that the necessity of providing rotating or running seals is eliminated.

In the prior art, power chucks are utilized in machining operations wherein a workpiece must be securely gripped and rotated at high speed. In such machining operations, chucks are provided which are adapted to be rotated by a drive means such as a lathe, and include radially movable jaws for gripping and releasing a workpiece. The chuck bodies are generally cylindrical in configuration with the master jaws being disposed at one end thereof and being capable of movement between a radially inward closed position and a radially outward open position. In use, a workpiece is placed parallel to the longitudinal axis of the chuck body and the jaws are closed radially inwardly about the workpiece. The rotation of the chuck body and the workpiece enables the latter to be machined. When the machining operation is completed, the jaws are urged into a radially outward open position releasing the workpiece.

Many power chucks in the prior art includes some type of actuator means such as a ring, which surrounds the periphery of the chuck body, and includes a plurality of keys engaged with the master jaws. Preferably, each key is disposed at an angle relative to the longitudinal axis of the chuck body such that the axial displacement of the actuator ring is operative to effect a radial movement of the master jaws.

In order to provide automatic, high speed, accurate operation of the latter prior art chucks, a fluid actuated drive assembly is provided which is operative to effect the axial movement of the actuator ring. The fluid actuated assembly includes a cylinder and a reciprocating piston which is actuated by fluid pressure, and the assembly further includes a plurality of rotating or running seals, disposed between the piston and the cylinder. The rotating seals which are generally formed from Teflon or graphite, are necessary to prevent fluid leakage between the piston and the cylinder. However, due to frictional forces inherent with running seals the rotational speed of a prior art chuck is limited. Further, at high speeds, fluid pressure within the rotating chamber builds up due to centrifugal forces often resulting in leakage and loss of clamping force. Even at low speeds, leakage will result from normal wear of the seals.

Accordingly, it would be desirable to provide an improved fluid actuated chuck wherein the piston-cylinder assembly is rotationally isolated from the chuck body, such that the requirement of providing running seals is eliminated.

Other prior art chucks which include fluid actuated jaws are disclosed in U.S. Pat. No. 3,918,352 issued Nov. 11, 1975 to Reich et al., U.S. Pat. No. 3,992,019 issued Nov. 16, 1976 to Crawshay, U.S. Pat. No. 4,032,161 issued June 28, 1977 to Peden et al., U.S. Pat. No. 4,032,162 issued June 28, 1977 to Flinchbaugh, and British patent specification No. 1,403,417 to Fink. The above cited patents disclose various hydraulic and pneumatic chucks having complex actuating mechanisms. Other methods previously used in the prior art to effect the actuation of the master jaws include fluid locking devices wherein internal valves are used to trap fluids. In the latter prior art chucks, leakage frequently occurs during the working cycle of the chuck resulting in seal failure, over heating and loss of chuck jaw clamping force.

Accordingly, it is an object of the subject invention to provide a new and improved fluid actuated chuck which eliminates the necessity of providing relatively unreliable running seals.

It is a further object of the subject invention to provide a new and improved fluid actuated chuck wherein the entire piston-cylinder drive assembly is rotationally immobile relative to the chuck body.

It is still a further object of the subject invention to provide a new and improved fluid actuated chuck wherein a transfer means is provided for transmitting the force generated by the piston-cylinder drive assembly to the actuator means of the chuck body for effecting the radial movement of the master jaws.

It is still another object of the subject invention to provide a new and improved fluid actuated chuck which includes a radial thrust bearing which is operative to transmit the axially directed forces generated by the piston-cylinder drive assembly to the actuator means, while enabling the drive assembly to remain rotationally immobile relative to the chuck body.

SUMMARY OF THE INVENTION

In accordance with these and many other objects, the subject invention provides for a fluid actuated chuck for securely gripping and rotating a workpiece. More specifically, a fluid actuated chuck is provided including a generally cylindrical body adapted to be rotated about its longitudinal axis and having a pair of master jaws which are radially movable for gripping and securing the workpiece to the chuck. An actuator ring is mounted around the periphery of the chuck body and includes a plurality of keys slidably receivable in keyways formed in the master jaws. The keys of the actuator ring are angled in a manner such that axial movements of the actuator bar, relative to the chuck body, are operative to effect the radial movement of the master jaws.

The fluid actuated chuck of the subject invention further includes a reciprocating piston-cylinder drive assembly which is rotationally mounted about the periphery of the chuck body. The drive assembly includes an immobile piston and a reciprocating cylinder, mounted therearound. The cylinder is capable of axial movement relative to the chuck body and is driven by fluid pressure. The entire piston-cylinder drive assembly is rotationally immobile relative to the chuck body.

A transfer means is provided for transmitting the axial movement of the cylinder of the drive assembly to the actuator ring. More particularly, a radial thrust bearing is provided which includes an inner race connected to the actuator ring. The thrust bearing further includes an outer race connected to the cylinder of the drive assembly. A plurality of ball bearings are disposed between the inner and outer races.

In operation, a rotational drive means is connected to the chuck body enabling it to rotate at high speeds. The piston-cylinder drive assembly which is actuated by fluid pressure generates an axially directed force. The radial thrust bearing functions to transmit the axially directed force to the actuator ring whereby the axial movement of the actuator ring is operative to effect the radial movement of the master jaws to either grip or release the workpiece. The piston-cylinder drive assembly of the subject chuck is rotationally immobile relative to the chuck body, thereby eliminating the necessity of providing running fluid seals or other fluid locking devices.

Further objects and advantages of the subject invention will become apparent from the following detailed description taken in conjunction with the drawings in which:

DESCRIPTION OF THE PREFERRED EMBODIMENT

Figure 1:
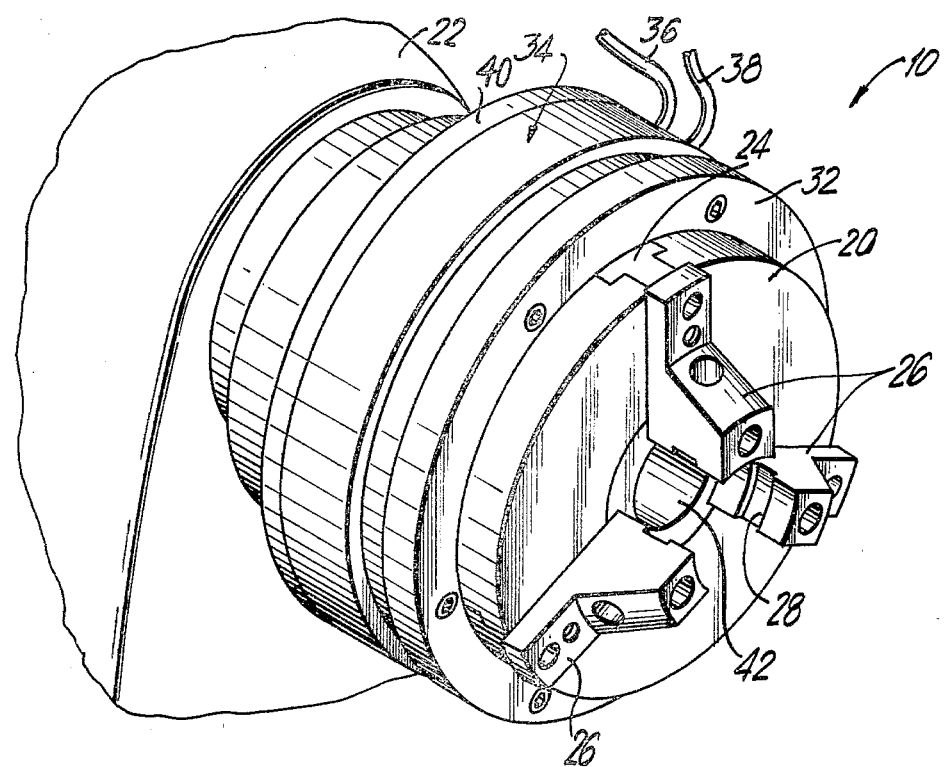
FIG. 1 is a perspective view of the new and improved fluid actuated chuck of the subject invention.
Figure 2:
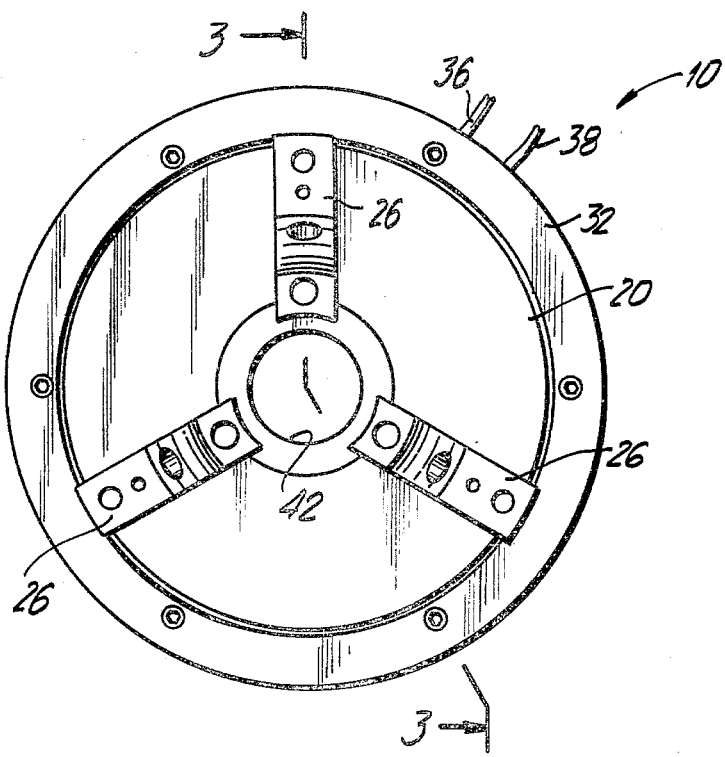
FIG. 2 is a front end elevational view of the new and improved chuck of the subject invention.

Referring to FIGS. 1 and 2, the new and improved fluid actuated chuck 10 of the subject invention is illustrated. More particularly, the fluid actuated chuck 10 includes a generally cylindrical body 20 having opposed workpiece holding and driving ends. The driving end of the chuck 10 is connected to a lathe 22 or other similar device which is capable of rotating the chuck 10 about its longitudinal axis. The opposed, workpiece holding end of the chuck 10 includes a plurality of radially removable master jaws 24 which are connectable to secondary jaws 26. Secondary jaws 26 include slots 28 to facilitate the mounting of variable thickness pads (not shown). In use, the thickness of the pads which are mounted on the secondary jaws 26 are selected to conform to the diameter of the workpiece to be gripped. The chuck 10, illustrated in the Figures, is a precision tool particularly useful in finishing operations.

The fluid actuated chuck 10 further includes a clamping ring 32 and a reciprocating piston-cylinder drive assembly 34. As illustrated in FIG. 1, hoses 36 and 38 are provided to supply pressurized fluid to the piston-cylinder drive assembly 34 to effect the movement of the jaws, as more fully described hereinafter. A rear cover 40 is connected to the driving end of the chuck body and functions as a dust shield.

Figure 3:
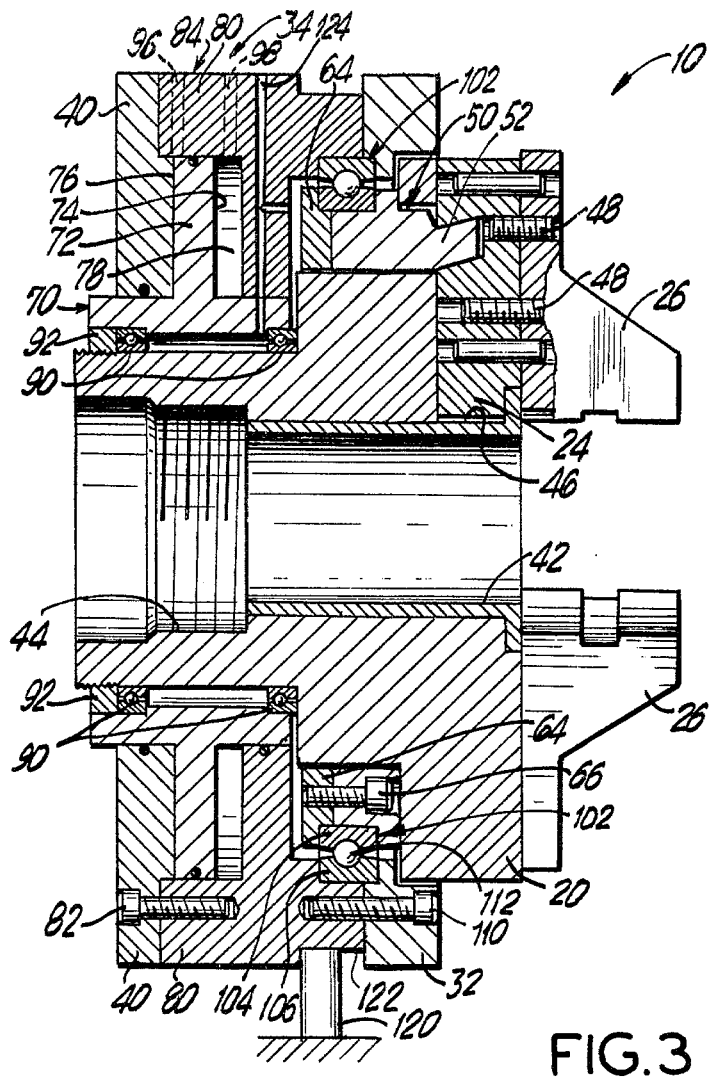
FIG. 3 is a cross sectional view of the fluid actuated chuck of the subject invention taken along the line 3—3 in FIG. 2, and illustrating the master jaws in the closed position.

Referring now to FIG. 3, it is seen that chuck body 20 includes a central bore 42 having a threaded portion 44 to facilitate the connection of the chuck 10 to the rotating driving means 22. Master jaws 24 are slidably mounted in slots 46 provided at the workpiece holding end of the chuck body 20. Slots 46 extend radially outwardly from the central axis of the chuck body, enabling the master jaws to move radially relative to the chuck. As illustrated in FIG. 3, a fastening means 48, such as threaded screws, may be provided for affixing the secondary jaws 26 to the master jaws 24.

Figure 4:
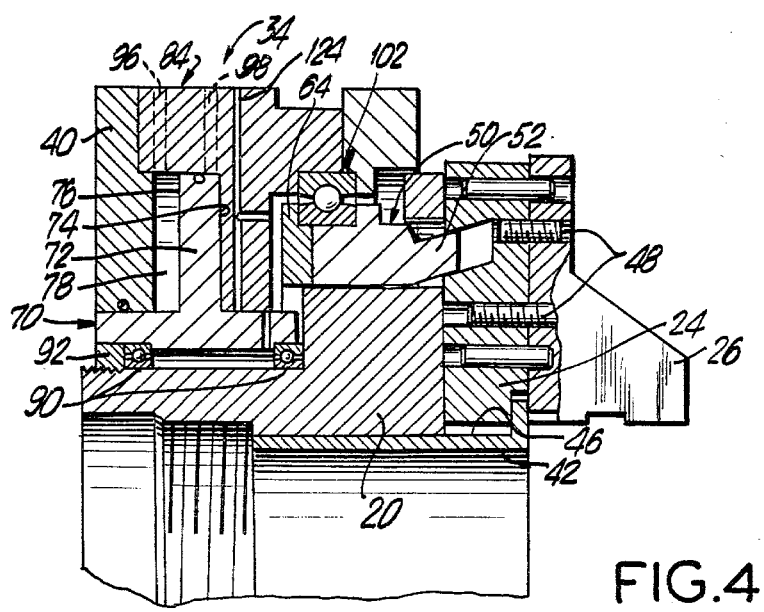
FIG. 4 is a partial cross sectional view, similar to FIG. 3, of the fluid actuated chuck of the subject invention, illustrating the master jaws in the open position.
Figure 6:
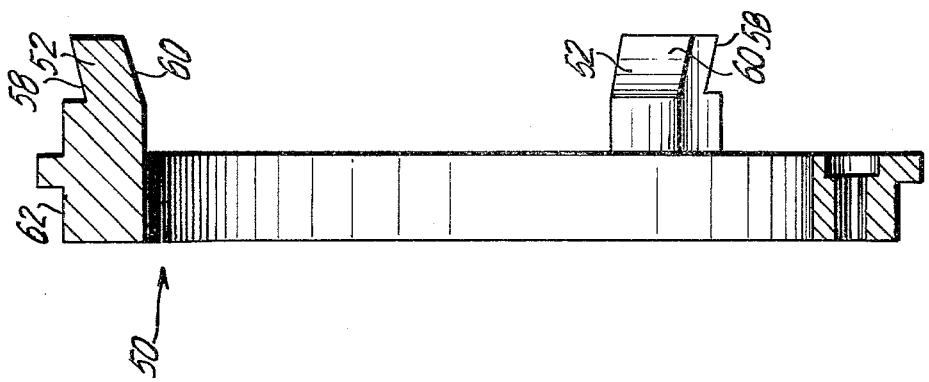
FIG. 6 is a cross sectional view of the actuator ring of the fluid actuated chuck of the subject invention taken along the line 6—6 in FIG. 5.
Figure 5:
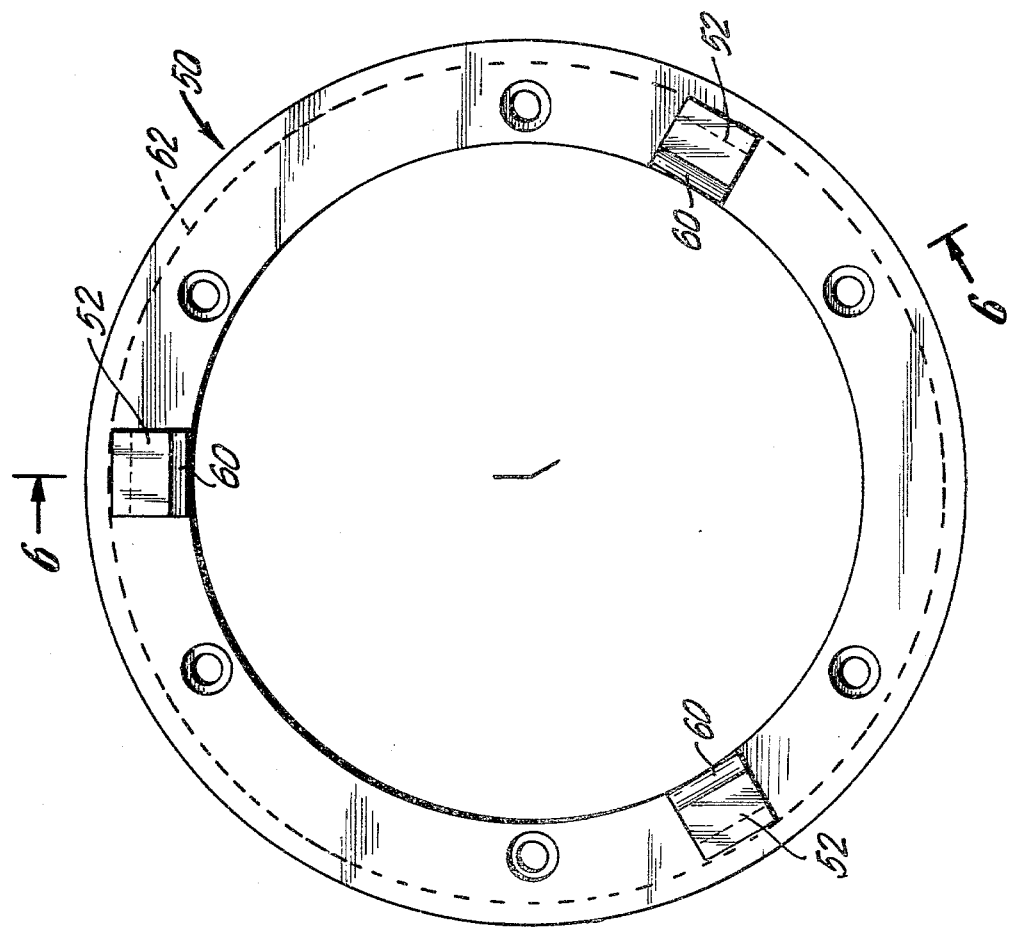
FIG. 5 is a front elevational view of the actuator ring of the fluid actuated chuck of the subject invention.

In accordance with the subject invention, an acutator ring 50 is provided disposed around the periphery of the chuck body 10. As illustrated in FIGS. 5 and 6, actuator ring 50 includes a plurality of keys 52, with each key 52 including an angled portion extending radially outwardly. The angled portion of each key 52, extends toward the workpiece holding end of the chuck, and is configured to be received in angled keyways 56 provided in each master jaw 24. In use, as the actuator ring 50 is moved axially towards the rear driving end of the chuck, the radially outer bearing surface 58 of each key 52 exerts a force on the associated master jaw 24 causing the latter to move radially outwardly, as illustrated in FIG. 4. Conversely, when the actuator ring 50 is driven axially, towards the workpiece holding end of the chuck 10, the radially inner bearing surface 60 of each key 52 will force the associated master jaw 24 radially inwardly to grip the workpiece.

Preferably, the inner diameter of the actuator ring 50 is precisely machined to closely match the outer diameter of the chuck body to insure accurate movement of the master jaws. More specifically, the space between the actuator ring 50 and the chuck body 10, should be minimized to prevent slippage, but provide enough clearance to permit the unhindered axial movement of the actuator ring relative to the chuck body. The radially outer, peripheral surface of the actuator ring includes an L-shaped lip 62, as illustrated in FIG. 6, which forms a portion of the slot for receiving and clamping the radial thrust bearing 102. A clamping ring 64 is connected to the actuator ring 50 by screws 66 and also includes an L-shaped lip to fully define the mounting slot for the radial thrust bearing, as more fully described hereinafter.

In accordance with the subject invention, a piston-cylinder drive assembly 34 is provided which is rotatably mounted around the periphery of the chuck body. Piston-cylinder drive assembly 34 includes a piston 70, which is T-shaped in cross section, as seen in FIG. 3. The radially extending portion 72 of the piston includes front and rear surfaces 74 and 76, respectively. The cylinder chamber 78 is defined by the cooperation between cylinder member 80 and rear dust cover 40. The cylinder member 80 and the rear cover 40 are secured together by screws 82, as illustrated in FIG. 3. The combination of cylinder member 80 and cover 40 will hereinafter be referred to as the cylinder 84.

In accordance with the subject invention, the piston-cylinder drive assembly 34 is rotationally immobile relative to chuck body 20. Preferably, piston-cylinder drive assembly 34 is rotatably mounted around the periphery of the chuck body 20 by means of thrust bearings 90 in conjunction with a clamping ring 92 such that the piston 70 is axially immobilized. In contrast, the cylinder 84 is capable of axial movement relative to the chuck body. More specifically, and as illustrated in FIG. 3, in the axially forward position, cylinder 84 is located such that rear wall of chamber 78 abuts the rear surface 76 of the piston 70. In the axially rearward position, as illustrated in FIG. 4, the front surface 74 of the piston 70 abuts the forward inner wall of the cylinder chamber 78.

The reciprocating movement of the cylinder 84 is achieved by virtue of fluid pressure which is injected into the drive assembly 34 through channels 96 and 98. Channels 96 and 98, which are connected to hoses 36 and 38, are preferably provided with two way valves permitting pressurization and evacuation alternatively.

For example, to shift piston 84 from the forward position illustrated in FIG. 3, to the rear position illustrated in FIG. 4, fluid, such as liquid or air under pressure, is injected into the cylinder chamber 78 through channel 96 and is simultaneously evacuated through channel 98. To shift the cylinder 84 back to its rear position, this procedure is reversed. The shifting of the cylinder 84 may be readily carried out while the chuck body 10 is rotated. As is apparent, since the drive assembly 34 is rotationally immobile, the necessity of providing running seals or other fluid locking devices is eliminated. Further, since cylinder chamber 78 is not rotated, there is no unwanted increase of internal fluid pressure due to centrifugal forces.

In accordance with the subject invention, a transfer means is provided for transmitting the axial movement generated by the piston-cylinder drive assembly 34 to the actuator ring 50 to effect the radial movement of the master jaws 24. The transfer means includes a radial thrust bearing 102 which is mounted between the piston-cylinder drive assembly 34 and the actuator ring 50. The radial thrust bearing 102 includes a radially inner circular race 104 which is seated and secured in the slot defined by the lip 62 of the actuator ring 50 and clamping ring 64. A radially outer circular race 106 is similarly secured between the piston-cylinder drive assembly 34 and a second clamping ring 32. As illustrated in FIG. 3, clamping ring 32 is secured to cylinder member 80 via screws 110. Suitable ball bearings 112 are provided between the inner and outer races 104, 106.

In operation, radial thrust bearing 102 transmits the forces generated by the piston-cylinder assembly 34 to the actuator ring 50. More specifically, in use, chuck body 20 is rotated at high speeds enabling the machining of the workpiece. With the jaws in the open position, as illustrated in FIG. 4, the workpiece is aligned with chuck body 20 and fluid is injected in the cylinder cavity 78, in a manner to force the cylinder 84 to move axially forward, towards the workpiece holding end of the chuck. This axial movement of cylinder 84 is transmitted to the actuator ring 50 by the thrust bearing 102 causing ring 50 to be urged to a forward position. The axial movement of ring 50 forces the keys 52 thereof into the keyways 56 of the master jaws. As discussed above, the insertion of the keys 52 into the keyways 56 the master jaws causes the latter to be forced radially inwardly to clamp the workpiece. In the alternative, to open the master jaws for releasing the workpiece, fluid is forced into the cylinder cavity 78 in a manner to shift the cylinder 84 axially rearwardly. This rearward axial motion is transmitted by the radial thrust bearing 102 to the actuator ring 50 such that the keys 52 are slidably withdrawn from the associated keyways 56. The withdrawal of the keys 52 from the keyways 56, as noted above, causes the master jaws to move radially outwardly, thereby releasing the workpiece.

Preferably, and as illustrated in FIG. 3, a stop pin 120 is provided which is fixedly connected to a non-rotational mounting at its lower end and is journaled, at its upper end, in an axially extending slot 122 in the cylinder member 80. While the radial thrust bearing 102 functions to substantially eliminate any friction between the piston-cylinder drive assembly 34 and the rotating chuck body 20, at relatively high rotational speeds, any friction remaining may cause the drive assembly 34 to rotate slowly. This secondary effect is eliminated by stop pin 120. Since the upper end of the stop pin 120 is journaled in a longitudinally extending slot 122, the axial movement of the cylinder 84 is not inhibited thereby.

In the preferred embodiment of the subject invention, lubrication channels 124 are provided, as illustrated in FIGS. 3 and 4, extending through the piston-cylinder drive assembly 34, and having a plurality of branches. The lubrication channels 124 are provided to facilitate the injection of lubricants to the periphery of the chuck body and the thrust bearings to reduce overheating and reduce friction. The lubricant can be injected in mist form, with centrifugal forces generated by the rotating chuck body 20 facilitating the dispersal of the lubricant.

In summary, there is provided a new and improved fluid actuated chuck 10 for securely holding and rotating a workpiece. More particularly, a chuck is provided including a cylindrical body 20 having a plurality of master jaws 24 connected to the workpiece end thereof and capable of radial movement relative to the chuck. An acutator ring 50 is provided disposed about the periphery of the chuck and includes a plurality of keys 52 which are operatively connected to the master jaws. By this arrangement, the axial movement of the actuator ring effects the radial movement of the jaws. A piston-cylinder drive assembly 34 is rotatably mounted around the periphery of the chuck body. The drive assembly, which is rotationally immobile relative to the chuck body, is capable of producing a reciprocating force directed along the longitudinal axis of the chuck body. A transfer means, consisting of a radial thrust bearing 102, is provided for transmitting the axial forces generated by the piston-cylinder dirve assembly to the actuator ring which in turn, effects a radial movement of the master jaws. The new and improved fluid actuated chuck of the subject invention eliminates the necessity of providing running seals in the piston-cylinder drive assembly.

Although the invention has been described in connection with a preferred embodiment, it will be apparent to those skilled in the art that additions, modifications and substitutions may be made without departing from the spirit and scope of the subject invention as defined by the appended claims. For example, it is within the scope of the subject invention to provide a piston-cylinder drive assembly wherein the piston is axially movable and the cylinder is stationary.

What is claimed is:

1. A rotatable chuck capable of holding a workpiece and adapted to be rotatably driven by a drive means comprising:

a generally cylindrical body having opposed workpiece holding and driving ends, said body being adapted to be rotated about its longitudinal axis by said drive means connected to its driving end, said body including a plurality of master jaws slidably mounted in radially extending grooves on said workpiece holding end such that said master jaws are radially movable relative to the longitudinal axis of said body, each said master jaw having a keyway opening on the end thereof most distant from the driving end of said body, each said keyway having opposed side walls parallel to the moving direction of said master jaws, each said keyway further including opposed inner and outer bearing walls disposed perpendicular to said side walls and at an acute angle to the longitudinal axis of said body;

an actuator ring concentrically and slidably disposed around the periphery of said body, said actuator ring having a key for each said master jaw, said keys projecting from one side of said actuator ring toward the workpiece holding end of said body and respectively slidably engaged with said master jaw keyways such that axial movement of said actuator ring relative to said body is operative to effect the radial movement of said master jaws, the opposite side of said actuator ring having an annular slot;

a reciprocating piston-cylinder drive assembly rotatably mounted about said body, said drive assembly including a fluid transfer means having first and second channels arranged such that alternate ejection and evacuation of fluids into said cylinder, about said piston, causes the axial movement of said cylinder relative to said chuck body, said drive assembly further including an integrated array of lubrication channels to facilitate the introduction of lubricants to reduce friction between said body and said drive assembly, said drive assembly further including an annular lip; and radial thrust bearing means coupled between said reciprocating means and said actuator means, said radial thrust bearing means including a radially outer circular race secured to the annular lip of said drive assembly, and a radially inner circular race secured to the annular slot of said actuator ring, whereby when said body is rotated independently, relative to said piston-cylinder drive assembly, said radial thrust bearing means is operative to transfer the axially directed forces generated by said drive assembly to said actuator ring thereby effecting the radial movement of said master jaws.

2. A rotatable chuck as recited in claim 1 further including a stop pin with one end thereof being fixedly mounted and with the opposed end thereof being connected to said piston-cylinder drive assembly in a manner such that said axial movement of said assembly is permitted while the rotational movement thereof, relative to said body, is inhibited.

* * * * *